Aug. 30, 1932.    J. STOECKLIN    1,873,986
PROTECTIVE RELAY
Filed Nov. 11, 1926

Witness:
R. Burkhardt

Inventor:
Josef Stoecklin,
Cromwell, Greist & Warden
Attys.

Patented Aug. 30, 1932

1,873,986

UNITED STATES PATENT OFFICE

JOSEF STOECKLIN, OF ZURICH, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

PROTECTIVE RELAY

Application filed November 11, 1926, Serial No. 147,791, and in Germany November 12, 1925.

My invention relates to protective relays, and it has particular relation to relays arranged to discriminatively disconnect sections of an electric distribution or transmission line in accordance with the impedance of the line so that the line sections which are nearest a fault are first cut out leaving the sound sections of the line in operation.

In protective systems of the above described character, as made heretofore, the circuit breakers separating the sections have been provided with relays arranged to vary the tripping time of the circuit breaker in accordance with the impedance of the line to the point where a fault occurred, thereby causing the circuit breaker nearest to the faulty section to automatically disconnect said section from the remainder of the system. The impedance responsive element of such relays which controls the time delay between the occurrence of the fault and the opening of the circuit breaker is usually actuated by an overload element so that, in general, the time delay element which is responsive to the impedance of the line is put into operation, or started, by the action of an overload element which operates only when the current in the line exceeds a predetermined upper value.

Relays of the above-described character have proved unsatisfactory since they fail to disconnect a faulty section unless the current flowing to the fault exceeds a certain value, the tripping current. The tripping current is usually adjusted with regard to the maximum capacity of the line, and if, at certain times, only a small number of generators is connected to the line, as on Sundays or holidays, the short-circuit or fault current that would flow from the generators is very often even less than the normal full-load current. Under such conditions the overload element which actuates the impedance element of the relay would fail to trip, and the faulty section would remain in the line with consequent danger to the entire system on account of surges that may be produced as a result of the fault.

Relays having a starting element depending for its operation on line resistance or reactance have also been proposed. Such elements are designed on the wattmeter principle, and although they do not suffer from the disadvantages inherent to the overload trip elements referred to above, they are nevertheless liable to trip unnecessarily when the currents and voltages passing through the instrument have certain phase relations. Such an instrument would in fact cause the line to be disconnected if the current were capacitive, although no fault were present.

It is among the objects of the present invention to provide a time delay impedance relay of the above described character which will be actuated irrespective of the amount of load on the line, and will be started whenever a fault will occur thereon.

Another object is the provision of a relay which is not influenced by the power factor of the line but is simply dependent for its operation on the relative magnitudes of the current and voltage.

According to my invention I start the time-impedance element of the relay, not by an overload element responsive to an excess of current in the line nor by a wattmeter type element liable to be influenced by the power factor, but by an element which only responds to changes in the ratio between the current and voltage in the line, so that when the impedance of the line is reduced below a certain value, it starts the resistance or impedance element that determines the tripping time of the circuit breaker.

The foregoing and other objects of my invention will be best understood from the accompanying drawing in which, Fig. 1 is a single-line wiring diagram of a distribution network utilizing protective relays embodying my invention;

Figure 1:
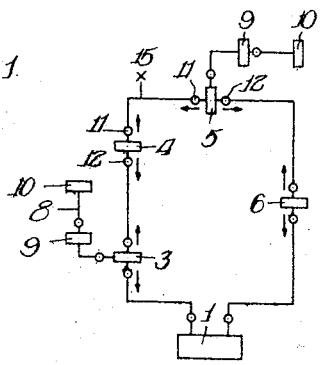

Referring to Fig. 1, a generator station 1 has connected thereto a power transmission ring having a number of sub-stations 3 to 6 distributed thereon for supplying energy to loads connected to said sub-stations. Branch transmission lines 8 for supplying additional sub-stations 9 and 10 may be connected to the ring at some of the sub-stations, as at 3 and 5. In order to secure uninterrupted service to the sub-stations, independently of a fault that may occur on any of the sections of the lines, each of said sub-stations is provided with circuit breakers 11, 12 whereby the lines leading to the sub-stations may be disconnected therefrom, and the lines sectionalized.

Distributing engineers designing such systems aim to so arrange the times at which the various circuit breakers of the system open in case of a short circuit, or other fault, on any of the line sections, that only the circuit breakers immediately adjacent to the faulty sections are opened, leaving the remainder of the system intact for supplying energy to the loads connected to the substations. Thus, if a fault should occur on the section of the line between the sub-stations 4 and 5, at 15, it is desired that only the circuit breakers 11 which connect said section with the respective adjacent sub-stations 4 and 5 shall open, thus leaving the entire system intact except for the faulty section which has been rendered dead.

It has been proposed to associate the circuit breakers in the several sub-stations with protective relays that are arranged to vary the tripping time of the breakers in accordance with the impedance of the line between the point where the breaker is disposed and the short-circuit point, or fault, on the line. Thus, for instance, if the tripping time of the circuit breakers at the several sub-stations varies inversely with the impedance of the line, which is proportional to the distance between the respective sub-stations and the point where the fault occurred, the circuit breakers at the sub-stations 4 and 5, nearest to the fault 15, will open first, and if these circuit breakers should for some reason fail to open, the circuit breakers at the sub-stations 3 and 6 which are farther away from the fault, will trip at a somewhat later time, and if the last-named circuit breakers should fail to trip, the circuit breakers at the generating station 1 will open at a somewhat later time.

As pointed out above the protective relays of the above described character heretofore used on such systems comprised an impedance element. In other words, each of the protective relays at the sub-stations had an element which responded in case a short circuit current would flow in the line. In response to said overload element the impedance element would be actuated for so determining the time within which the circuit breakers would open. After the actuation of the overload element the circuit breaker would open sooner or later, depending on the distance of the respective circuit breakers from the point where the fault occurred.

Again if the tripping element of the relay works on the wattmeter principle and starts up in accordance with the reactance (or a component containing chiefly reactance) of the line, the relay may be operated by a leading current, even though no fault exists, which is undesirable and should be avoided. I have therefore provided a relay in which the starting is controlled by an element uninfluenced by the direction of the flow of energy and dependent for its operation solely on the ratio between voltage and current $$\frac{E}{I},$$

in the line. On the contrary the time lag element is preferably of the wattmeter type and influenced principally by the reactance of the portion of line lying between the relay and the fault. Such an element will deflect in the opposite sense when the flow of energy reverses, thereby giving a discriminative action the advantage of which is pointed out later. It should be noted that the chief use of the relay here described is for clearing shorts of considerable severity between phases.

Figure 2:
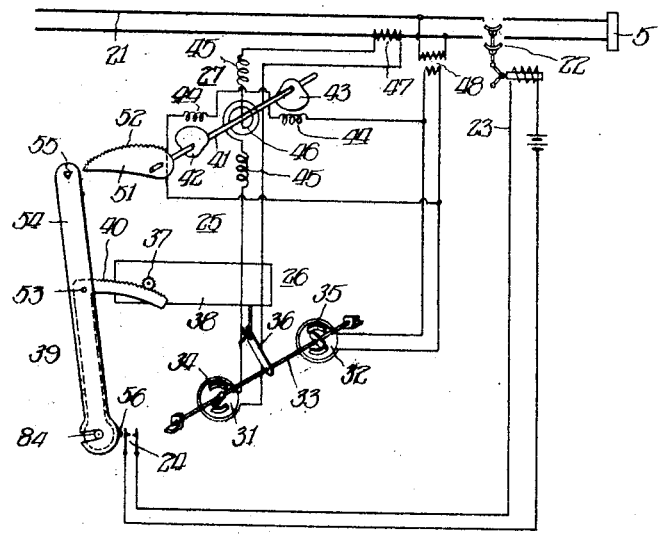
Fig. 2 is a diagrammatic view of a protective relay embodying my invention, and the circuits associated therewith.

A protective system embodying my invention is illustrated in Fig. 2 which shows a sub-station, for instance sub-station 5, with a transmission line 21 connected to the substation through a circuit breaker 22 that is arranged to be tripped by a suitable tripping circuit 23, that may be energized by closing a pair of contact members 24.

The closing and opening of the contact members 24 which control the tripping of the circuit breaker 22 is regulated by a relay device 25 comprising an impedance responsive element 26 for determining whether or not the circuit break 22 shall be tripped, and another impedance or reactance responsive element 27 which determines how long after the actuation of the trip controlling impedance element 26 the circuit breaker shall be tripped.

The elements 26 and 27 for controlling the actuation of the tripping mechanism and for controlling the time delay in the tripping action, may be constructed and combined in a variety of ways to produce the resulting effects set forth above.

In the arrangement shown in Fig. 2 the tripping or actuating element 26 comprises two soft-iron moving elements 31, 32, mounted on a common spindle 33 to rotate the same in opposite directions, respectively, in response to the differential action of the line current, flowing through coil 34 co-operating with one moving element, and the line voltage, which energizes a coil 35 of the other moving element, respectively. Since the current actuated element 31 and the voltage actuated element 32 tend to rotate the spindle 33 in opposite directions, the deflection or the position of the spindle will be determined by the ratio of the voltage to the current, which is a measure of the line impedance.

The spindle 33 carries an arm 36 which controls the engagement of a pinion 37 in a timing mechanism or clockwork 38, with a quadrant lever 39 having a rack segment 40 adapted to be engaged by the pinion and moved thereby around a pivot 84 in clockwise direction. The actuating impedance element 26 is so adjusted that when the ratio of voltage to current $\frac{E}{I}$ is normal, that is, when the line is free from short circuit or other faults, the opposing actions of the current and voltage elements 31, 32 will maintain the arm 36 in such position that the pinion 37 is out of engagement with the rack segment 40, so that the rack segment will stay in its normal position toward the left. However, if the impedance of the line should drop by reason of a fault occurring thereon, the arm 36 will be so rotated that the pinion 37 of the clockwork, or timing element 38 comes into engagement with the rack segment 40 moving the quadrant lever 39 toward the right in clockwise direction, and thereby bringing into function the time-lag or time-relay element 27 of the relay.

The time-lag, or time-relay element 27 is shown in the form of a wattmeter type instrument comprising a rotatable spindle 41 carrying two soft iron vanes 42, 43 arranged to cooperate with a pair of voltage coils 44 and current coils 45, the latter being connected in series with a coil 46 surrounding the spindle 41 to magnetize the latter, and the vanes. The current coils 45, 46 of the element 27 and the current coil 34 of the impedance element 26 may be energized in series from a current transformed 47 on the line 21, while the voltage coils 44 and 35 of the two elements may be energized in parallel through a potential transformer 48 connected to the lines.

The spindle 41 of the time delay element 27 carries a toothed segment 51 having a contour 52 of special shape. The segment 51 will assume different positions in space depending on the ratio of the voltage and the current acting on the vanes 42 and 43, so that the position of the segment 51 is also controlled by the impedance of the line or reactance (as desired). The relay element 27 is furthermore so arranged that the segment 51 will be deflected in opposite directions, depending on the direction of the flow of energy in the line.

The quadrant lever 39 carries on a pivot 53 at the upper end thereof a rocking lever 54 having at its upper end a catch 55 adapted to engage the teeth on the curved contour of the segment 51, and at its lower end a lug member 56 arranged to close the contact members 24 when moved toward the right. The time-delay element 27 is so connected that, with the power flowing through the circuit breaker 22 in the direction away from the sub-station 5, the tooth segment 51 will be lowered to a more or less degree, depending on whether the impedance of the line is greater or smaller. That is, at low line impedance, the position of the segment 51 will be such that when the rocking lever 54 is moved by the quadrant lever 39 towards the right, the catch 55 will strike the tooth segment 51 after a very short time, corresponding to the low line impedance, and the further rotation of the quadrant lever 39, by the clockwork 38 will cause the lower end of the rocking lever to be swung toward the right, thereby closing the contact members 24 and energizing the tripping circuit 23 of the circuit breaker to disconnect the line 21 from the sub-station.

On the other hand, if the distance from the sub-station to the fault is great, and the impedance of the line accordingly large, the position of the tooth segement 51 of the time-lag relay 27 will be such that the catch 55 will describe a rather long arc before engagement with the tooth of the segment 51, and the movement of the timing mechanism 38 will not operate the lever 54 to close the contact members 24 of the circuit breaker tripping circuit until after a relatively long time-delay corresponding to the higher impedance of the line.

The foregoing arrangement will thus hold the circuit breaker open as long as the impedance of the line exceeds a predetermined value, since the actuating or starting element 26 of the relay holds the clockwork 38 out of engagement with the element which actuates the time-delay feature of the relay.

If the impedance drops below the prefixed value, the timing mechanism 38 begins to function and the circuit breaker will be tripped after a longer or shorter time, depending on the position of the element 27 which controls the time-delay in the tripping action.

As pointed out above, the impedance responsive time-lag element 27 will deflect in one direction or another, depending on the direction of the flow of energy. For instance, should the energy in the line 21 flow toward the sub-station 5 the spindle 41 will be rotated so that the tooth segment 51 is raised. Since the actuating or starting element 26 of the relay is independent of the direction of the energy flow, a short circuit or fault will bring the clockwork 38 into engagement with the lever 39, pulling the rocking lever 54 toward the right. However, since the tooth segment 51 is raised, the catch member 55 of the rocking lever will move beneath the segment, and hence no tripping will occur until after the lever reaches the end of its travel, that is, after a comparatively long interval.

The significance of the directional feature embodied in this construction appears clearly from a consideration of the wiring diagram shown in Fig. 1. If the sub-stations 3 to 6 are provided with protective relays, referred to hereinabove, so arranged as to operate only in case of energy flow away from the sub-station in the directions indicated by the arrows shown adjacent to the circuit breakers at the several sub-stations, and a fault should occur at any point of the line, for instance at 15, the circuit breakers at the sub-stations 4 and 5 will be caused to operate so as to isolate the faulty line section from the remainder of the system. If the protective relays on said sub-stations would fail to discriminate between the directions of the energy flow, a fault at 15 would cause the tripping of the circuit breaker 11, which connects the outgoing line of the sub-station, as well as of the circuit breaker 12, which connects the incoming line to the sub-station, since practically the same voltage and current conditions exist in both circuit breakers which are close to each other at the same sub-station. Such operation of the circuit breakers would be unsatisfactory since the load that is usually supplied from the sub-stations would be disconnected from the line.

By embodying the directional element in the relay, only the circuit breakers 11, which are disposed on the sides of the sub-stations toward the fault, will be caused to open so that the other loads which are connected to the sub-stations adjacent to the faulty line section will continue to be supplied with energy. Thus, if the relays associated with the circuit breakers 11 and 12 at sub-station 5 are so arranged that the time lag mechanism operates only if energy from the sub-station flows in the direction away from the sub-station, as indicated by arrows, the tooth segment 51 of the relay associated with the circuit breaker 11 will be lowered, while the corresponding segment of the other circuit breaker 12 will be lifted, causing the tripping of the circuit breaker 11 and leaving the circuit breaker 12 in closed position.

The foregoing arrangement provides thus a relay which combines an element controlled by the resistance or impedance of the line for determining the tripping time of the circuit breaker with an element, depending on the ratio $\frac{E}{I}$, which starts the tripping operation, or the running of the time delay feature of the tripping mechanism. A relay of the foregoing type will operate even if the fault current is less than the normal current of the fully loaded system.

By making the starting or actuating element of the relay with current and voltage elements of the soft iron type acting in opposite directions, the deflection of said element will be proportional to the quotient of the voltage and current, but independent of the direction of the flow of energy, a feature which is particularly important in an interconnected or ring line system.

In order to give the increased safety against improper tripping, the relay may be so arranged that under normal operating conditions only the actuating or starting element is in the circuit, while the time-delay element is cut out and connected only after the actuating element is in a position for starting the tripping mechanism. Since the action of both elements depends on the line impedance, and they operate in chronological sequence, the two elements may be combined into one which first determines the tripping action and starts the running of the time-delay mechanism, and then functions to determine said delay.

In the preferred construction of my relay I make the timing element in the shape of a clockwork, or the like, which is substantially unaffected by the electrical conditions in the system. This is very desirable since, if the timing mechanism depends on line conditions it may under certain circumstances have to operate on abnormally low currents, varying as much as fifty per cent from the normal value. If it is adjusted to operate properly on the low current, the energy consumption on heavy currents will be excessive. Accordingly, a clockwork mechanism which is wound up in any standard way is preferable.

The improved relay thus provides greater reliability of operation, avoids unnecessary tripping, and secures precision in disconnecting the faulty sections of the line.

Figure 3:
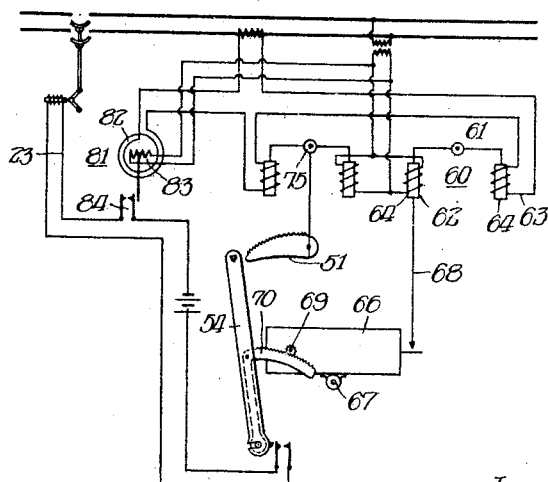
Fig. 3 is a view similar to Fig. 2 illustrating a modification of my invention.

My invention may be embodied in a variety of other constructions, one example of which is shown in Fig. 3. The relay combines an actuating impedance responsive element 60 having a rocking lever 61, fulcrumed at the center and operated by a voltage coil 62 and a current coil 63, acting on cores 64 which are connected at the ends of the rocking lever 61. As in the case of the relay shown in Fig. 2, the oppositely acting forces exercised on the rocking lever 61 by the voltage and current coils 62 and 63, respectively, will so determine the actuation of a clockwork mechanism 66 adapted to be pivoted around a fulcrum 67 by an arm 68 extending from the rocking lever 61, that when the impedance of the line is above a normal minimum value a driving pinion 69 of the clock mechanism 66 will remain out of engagement with a rack segment 70 of a mechanism similar to that shown in Fig. 2. If the impedance of the line should drop, on account of a short circuit, or other fault, the arm 68 extending from the rocking lever 61 of the actuating element is lifted, bringing the pinion 69 into engagement with the rack segment 70, and causing movement of the lever 54 toward the right until the same has come into engagement with a tooth segment 51, similar to that of Fig. 2. The position of the tooth segment 51 is, in turn, determined by the operation of a time-delay control element 75 which may be similar in construction to the actuating element 60 to vary the inclination of the tooth segment in accordance with the ratio of the voltage to the current.

Since the actuating element 60 as well as the time element 75 are of the soft iron type and do not discriminate between the directions of the power flow in the line, a directional element 81 may be so combined with the first two elements as to restrict the tripping operation only to the circuit breaker through which the current flows away from the sub-station. The directional element 81 may comprise a wattmeter comprising a current coil 82 and a voltage coil 83 cooperating with each other to effect contacting engagement of the normally separated contact members 84 included in the tripping circuit 23 of the circuit breaker if power flows in the direction away from the sub-station. The operation of the relay in Fig. 3 is otherwise similar to that described in Fig. 2.

I claim as my invention:

1. In relay apparatus, an operating member, an element supported for adjusting movement and for coaction with said member and being operable by virtue of such movement and such coaction to control operating action of said member, means operable to impart operating movement to said member into coacting relationship with said element and to subsequently continue such movement, and means disposed for cooperation with said member upon such continued movement thereof and being operable by virtue of such cooperation to effect relaying operation of said apparatus.

2. In an electrical system, a connecting line, switch means for controlling said line, an operating member operable to control switching action of said switch means, an element supported for adjusting movement and for coaction with said member and being operable by virtue of such movement and such coaction to control operating action of said member, means responsive to abnormal electrical conditions in said line and being operable upon occurrence of such to impart adjusting movement to said element in amount substantially proportional to the degrees of such conditions, means operable to impart movement to said member into coacting relationship with said element, and means operable to control operating action of said last-named means with respect to said member.

3. In an electrical system, a connecting line, switch means for controlling said line, an operating member operable to control switching action of said switch means, an element supported for adjusting movement and for coaction with said member and being operable by virtue of such movement and such coaction to control operating action of said member, means responsive to abnormal electrical conditions in said line and being operable upon occurrence of such to impart adjusting movement to said member in amount substantially proportional to the degrees of such conditions, means operable to impart movement to said member into coacting relationship with said element, and means responsive to such conditions and being operable upon occurrence of such to initiate operating action of said last-named means with respect to said member and to stop such action upon subsequent removal of such conditions.

4. The combination with an electrical transmission line, and a circuit breaker associated therewith operative to disconnect a section of said line, of a relay operation in dependence upon the impedance of said line, the said relay comprising a timing element, an actuating element for initiating the operation of said timing element to control said disconnecting operation of said circuit breaker, a time-delay element for determining the length of time during which said timing element operates from the moment of initiation of its operation to the moment of carrying out the same, and means operative to restrain operative actuation of said relay in response to the energy flow in a predetermined direction, the operation of said actuating element and of the said time-delay element being responsive to the ratio of the line voltage to the line current upon the occurrence of a fault in the said line.

5. The combination with an electrical transmission line, and a circuit breaker associated therewith operative to disconnect a section of said line, of a relay operative in dependence upon the impedance of said line upon the occurrence of a fault therein, the said relay comprising a timing element, an actuating element for initiating the operation of said timing element to control said disconnecting operation of said circuit breaker, and a time-delay element for determining the length of time during which said timing element operates from the moment of initiation of its operation to the moment of carrying out the same, the effective operation of said actuating element being responsive to the ratio of the line voltage to the line current, and the effective operation of the said time-delay element being responsive to the ratio of the line voltage to the line current and in dependence upon energy flow in a predetermined direction.

6. The combination with an electrical transmission line, and a circuit breaker associated therewith operative to disconnect a section of said line, of a relay operative in dependence upon the impedance of the said line upon the occurrance of a fault therein, the said relay comprising a timing element, an actuating element for initiating the operation of said timing element to control said disconnecting operation of said circuit breaker, a time-delay element for determining the length of time during which said timing element operates from the moment of intiation of its operation to the moment of carrying out the same, the effective operation of said actuating element and the said time-delay element being responsive to the ratio of the line voltage to the line current, and the means for actuating the said actuating element comprising elements operative in opposite directions by the line voltage and the line current respectively.

7. The combination with an electrical transmission line and a circuit breaker associated therewith operative to disconnect a section of said line, of a relay operative in dependence upon the impedance of said line upon the occurrence of a fault therein, the said relay comprising a timing element, an actuating element for initiating the operation of the said timing element to control said disconnecting operation of said circuit breaker, means operative responsive to the ratio of the line voltage to the line current and independently of the direction of energy flow effective to cause operation of the said actuating element, a time-delay element for determining the length of time during which said timing element operates from the moment of initiation of its operation to the moment of carrying out the same, and means operative responsive to the ratio of the voltage of the line to the line current and in dependence upon a predetermined direction of energy flow to cause operation of said time-delay element.

In testimony whereof I have hereunto subscribed my name this 23 day of October A. D. 1926, at Zurich, Switzerland.

JOSEF STOECKLIN.